US011212318B2

(12) United States Patent
Mani et al.

(10) Patent No.: US 11,212,318 B2
(45) Date of Patent: Dec. 28, 2021

(54) VERIFYING SERVICE ADVERTISEMENTS USING ATTESTATION-BASED METHODS

(71) Applicant: Cisco Technology, Inc., San Jose, CA (US)

(72) Inventors: Selvaraj Mani, Union City, CA (US); Frank Brockners, Cologne (DE); Shwetha Subray Bhandari, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 242 days.

(21) Appl. No.: 16/684,094

(22) Filed: Nov. 14, 2019

(65) Prior Publication Data

US 2020/0322386 A1 Oct. 8, 2020

Related U.S. Application Data

(60) Provisional application No. 62/830,358, filed on Apr. 5, 2019.

(51) Int. Cl.
*H04L 29/06* (2006.01)
*H04L 9/32* (2006.01)
*H04L 29/12* (2006.01)

(52) U.S. Cl.
CPC .......... *H04L 63/20* (2013.01); *H04L 9/3213* (2013.01); *H04L 9/3234* (2013.01); *H04L 9/3247* (2013.01); *H04L 9/3271* (2013.01); *H04L 61/1511* (2013.01); *H04L 63/126* (2013.01)

(58) Field of Classification Search
CPC ..... H04L 63/20; H04L 63/126; H04L 9/3234; H04L 61/1511; H04L 9/3247; H04L 9/3213; H04L 9/3271
See application file for complete search history.

(56) References Cited

U.S. PATENT DOCUMENTS

| 8,842,835 B2 * | 9/2014 | Geyzel .................... H04L 9/085 380/277 |
|---|---|---|
| 8,990,933 B1 * | 3/2015 | Magdalin ............ H04L 63/1483 726/22 |
| 9,137,210 B1 * | 9/2015 | Joglekar ................ H04L 63/061 |
| 2012/0096166 A1 * | 4/2012 | Devarapalli ........ H04L 67/1002 709/226 |
| 2013/0152076 A1 * | 6/2013 | Patel .................... G06F 9/45558 718/1 |
| 2014/0068043 A1 * | 3/2014 | Archbold ............ H04L 61/1511 709/223 |
| 2016/0142429 A1 * | 5/2016 | Renteria ............. H04L 63/1416 726/23 |
| 2016/0248596 A1 * | 8/2016 | Beaudet ................... H04L 12/66 |
| 2018/0159815 A1 * | 6/2018 | Halley ................ H04L 61/3025 |
| 2018/0343122 A1 * | 11/2018 | Spacek ...................... H04L 9/14 |
| 2019/0042796 A1 * | 2/2019 | Von Bokern ............ G06F 21/78 |

* cited by examiner

*Primary Examiner* — Sher A Khan
(74) *Attorney, Agent, or Firm* — Polsinelli PC

(57) ABSTRACT

Technologies for attestation techniques, systems, and methods to confirm the integrity of a device for service discovery and more specifically, for proving trustworthiness of particular service devices and/or mDNS controller/network elements with respect to DNS/mDNS service discovery. Such attestation techniques may implement canary stamps (e.g., tokens or metadata elements containing or reflecting security measures taken at the device).

14 Claims, 14 Drawing Sheets

VERIFYING SERVICE ADVERTISEMENTS USING ATTESTATION-BASED METHODS

CROSS-REFERENCE TO RELATED APPLICATIONS

This application claims the benefit of, and priority to, U.S. Provisional Patent Application No. 62/830,358 filed on Apr. 5, 2019, entitled "VERIFYING SERVICE ADVERTISEMENTS USING ATTESTATION-BASED METHODS", the contents of which are incorporated herein by reference in their entirety.

TECHNICAL FIELD

The present disclosure generally relates to the field of computer networking, and more particularly to assessing reliability and trustworthiness of devices operating within a network.

BACKGROUND

Trustworthiness of a given device operating within a network may degrade from the time of its initial configuration. Active measurements may be needed to validate that a device is equivalently trustworthy to the time of its initial deployment. In some cases, certain verification checks can be implemented to attempt to verify the integrity of a device in order to reduce or mitigate the harm caused by the device becoming compromised. For example, an integrity verification application can check a device's memory to validate the integrity of the device. When errors are found during the check, the integrity verification application can implement steps to return the device to a trusted state.

However, such verification checks are expensive and unreliable, often inaccurately assuming that a device is likely to be in a normal or trusted state soon after being validated and less likely to be in a normal state just before such validation.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
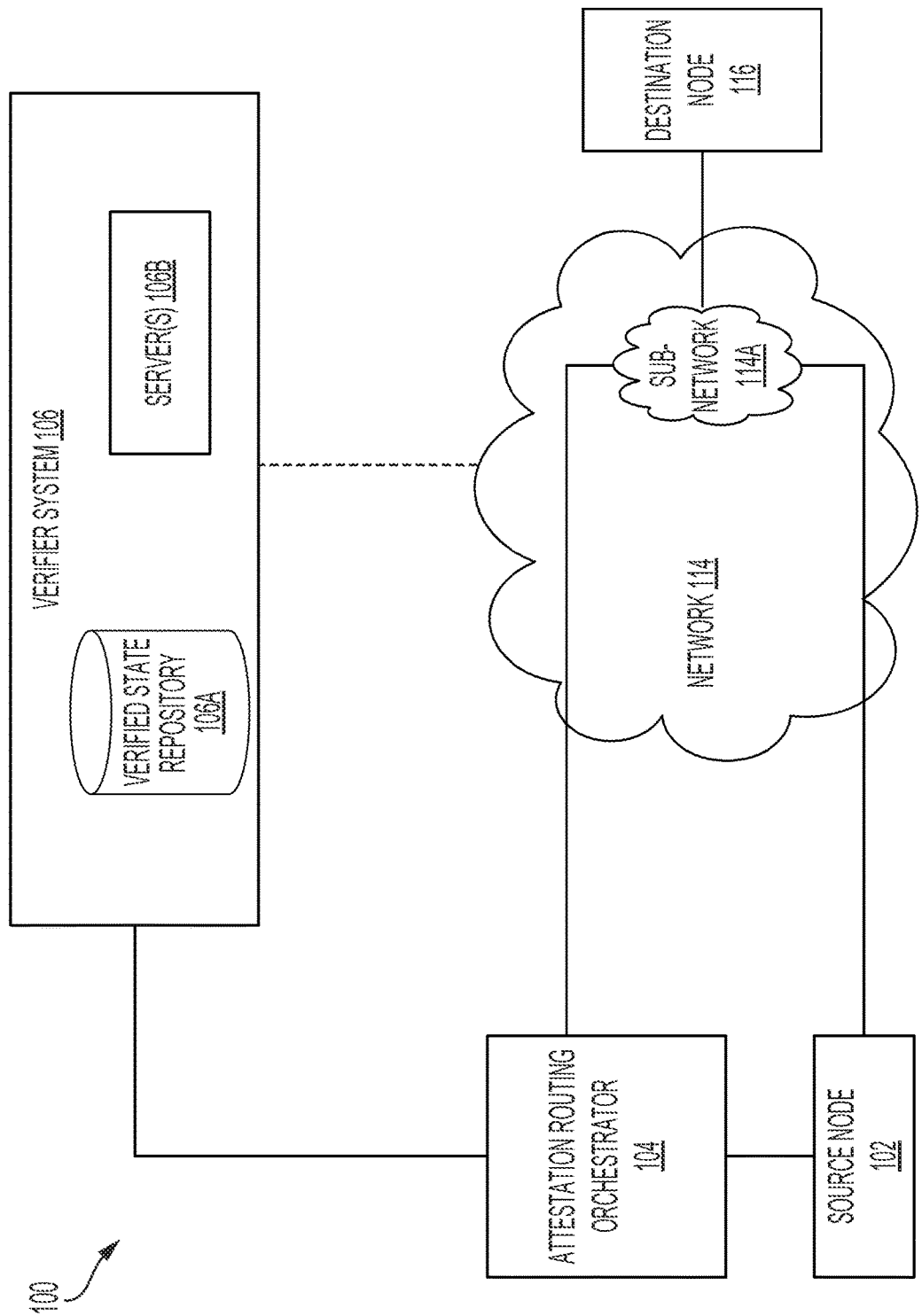
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods and computer-readable storage media for applying a network policy. In some aspects, an example method can include receiving a domain name service (DNS) message comprising attestation information from a sender, identifying a level of trust for the sender based on the DNS message, and applying a network policy to the sender based on the level of trust.

In some aspects, an example method, comprising: sending a service provider request within a network having one or more network devices sharing a server; receiving a response from a responding network device, wherein the response comprises an answer; identifying a level of trust of the responding network device based on the answer; and applying a network policy to the responding network device based on the level of trust, wherein the message further comprises a service request for a particular service and the responding network device offers the particular service. The service provider request may be a DNS request and the response may be a DNS response.

The DNS response may further comprises metadata about a proof of integrity of the responding network device provided by an evaluation of the answer, by a trusted platform module crypto-processor, with respect to an identity of hardware and software components of the responding network device, and the answer is evaluated based on logs maintained in a trusted storage of the responding network device, wherein the logs indicate a set of transactions that have occurred since boot time and provides data regarding trustworthiness of the responding network device.

The DNS response may further comprises a proof of freshness using a signature over verifiably fresh data such as a current time when the DNS response is sent. The DNS message may comprise a challenge comprising a nonce that is passed through a trusted platform module crypto-processor associated with the responding network device to generate a signature based on the nonce, wherein the signature could not been generated before the nonce was provided, and wherein the DNS response comprises the signature.

The DNS response may further comprise a proof of freshness by a token, wherein the DNS server validates the token with respect to the responding network device's freshness of data based on a state of internal counters within a trusted platform module crypto-processor associated with the responding network device, and wherein the DNS server hosts a directory of reference integrity values, known good reference values, and public keys published as certificates of other peer devices for validating the tokens. The DNS server may detect a change in an IP address of the responding network device and dynamically identifies a level of trust for the responding network device before updating the IP address in the dynamic DNS server's directory, by re-validating information the token appended to the responding network device's DNS response indicating a change in IP address.

The computer-implemented method may further comprise receiving multiple DNS responses from multiple responding network devices, each DNS response comprising a random number, forming a set of random numbers, wherein the set of random numbers are algorithmically combined into a single nonce, and wherein the single nonce is passed through a crypto-processor to generate a signature based on the single nonce. The set of random numbers may be combined algorithmically into a single nonce using a Bloom filter. The network policy for the responding network device may be reevaluated at a predetermined frequency.

In some aspects, an example method can include broadcasting a multicast domain name service (mDNS) message; receiving a mDNS response from a responding service provider, wherein the mDNS response comprises an answer; identifying a level of trust of the responding service provider based on the answer; and applying a network policy to the responding service provider based on the level of trust, wherein the mDNS message further comprises a service request for a particular service and a responding network device offers the particular service.

The mDNS response may further comprise metadata about the responding network device's proof of integrity provided by an evaluation of the answer, by a trusted platform module crypto-processor, with respect to the identity of hardware and software components of the responding network device. The answer may be evaluated based on logs maintained in a trusted storage of the responding network device, wherein the logs indicate a set of transactions that have occurred since boot time and provides data regarding the responding network device's trustworthiness. The mDNS response may further comprise a proof of freshness by means of a token, wherein the token validates the responding network device's freshness of data based on a state of internal counters within a trusted platform module crypto-processor associated with the responding network device. The token may comprise extracted current counters from the responding network device's trusted platform module crypto-processor and hashed with information within an external trusted platform module crypto-processor.

In some aspects, an example method can include receiving a service request message comprising a service request for a particular service and attestation metadata; identifying a level of trust of the service request end device based on the attestation metadata; applying a network policy to the service request end device based on the level of trust; and broadcasting the service request message for a responding service provider that offers the particular service. The attestation metadata may comprises metadata about the service request end device's proof of integrity provided by an evaluation of the attestation metadata, by a trusted platform module crypto-processor, with respect to the identity of hardware and software components of the service request end device. The attestation metadata may be evaluated based on logs maintained in a trusted storage of the service request end device, wherein the logs indicate a set of transactions that have occurred since boot time and provides data regarding the service request end device's trustworthiness. The service request message may further comprise a proof of freshness by means of a signature over verifiably fresh data such as a current time when the service request message is sent.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

EXAMPLE EMBODIMENTS

The technologies herein can provide attestation techniques to confirm the integrity of a device or service. In some cases, such attestation techniques can implement canary stamps (e.g., tokens or metadata elements containing or reflecting security measures taken at the device). Disclosed herein are systems, methods and computer-readable storage media for proving trustworthiness of particular service devices and/or network elements with respect to DNS or multicast DNS (mDNS) service discovery.

DNS service discovery is a way of using standard DNS programming interfaces, servers, and packet formats to browse a network for device that can offer particular services. Service advertisement and discovery involve crawling the networked services available in an enterprise network. The DNS system can locate a network device by translating the hostname of the device into its associated IP address.

Apple Bonjour is another example for service discovery and is a precursor to stardards of the mNDS protocol. mDNS allows for discovery of services within Local Area Network (LAN) using link local multicast. mDNS is also extended to for discovery of services outside of its local area network via a mDNS responder/controller such as a Cisco Wireless LAN Controller (WLC). mDNS uses familiar DNS programming interfaces, packet formats and operating semantics, and allows for client devices to find services outside of its virtual local area network (VLAN) via a multicast controller, such as a Cisco Wireless LAN Controller (WLC), that acts as an mDNS responder. mDNS may predominantly be used in enterprise Internet of Things (IoT) technologies to announce/discover the services because, it requires little or no administration or configuration to set the service advertising network up and running. mDNS is based on User Datagram Protocol (UDP) and is an unsecured (no encryption, secure registration, etc.) protocol that anyone can spoof to mimic a service owner. This can be dangerous in case of enterprise IoT deployments where on-boarding user devices (e.g., Bring-your-own-device (BYOD) devices) will be relying on the discovered service details from mDNS controller/network element as authentic. mDNS is prone to man-in-the-middle (MITM) attack due its nature of protocol operation and limitations. Additionally, there is no mechanism to validate the current trust state of the service announcers.

Figure 8:
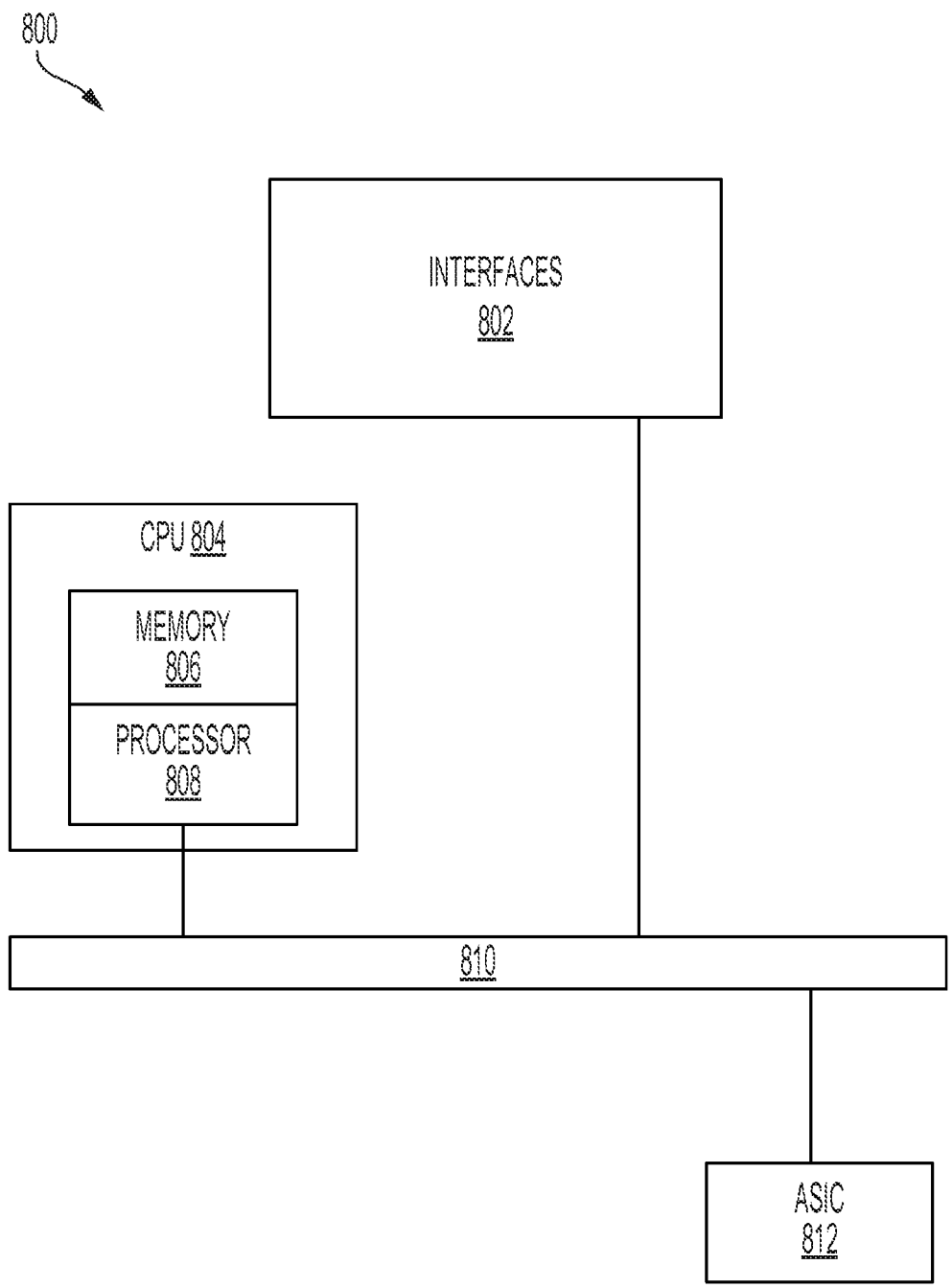
FIG. 8 illustrates an example network device in accordance with some examples.
Figure 9:
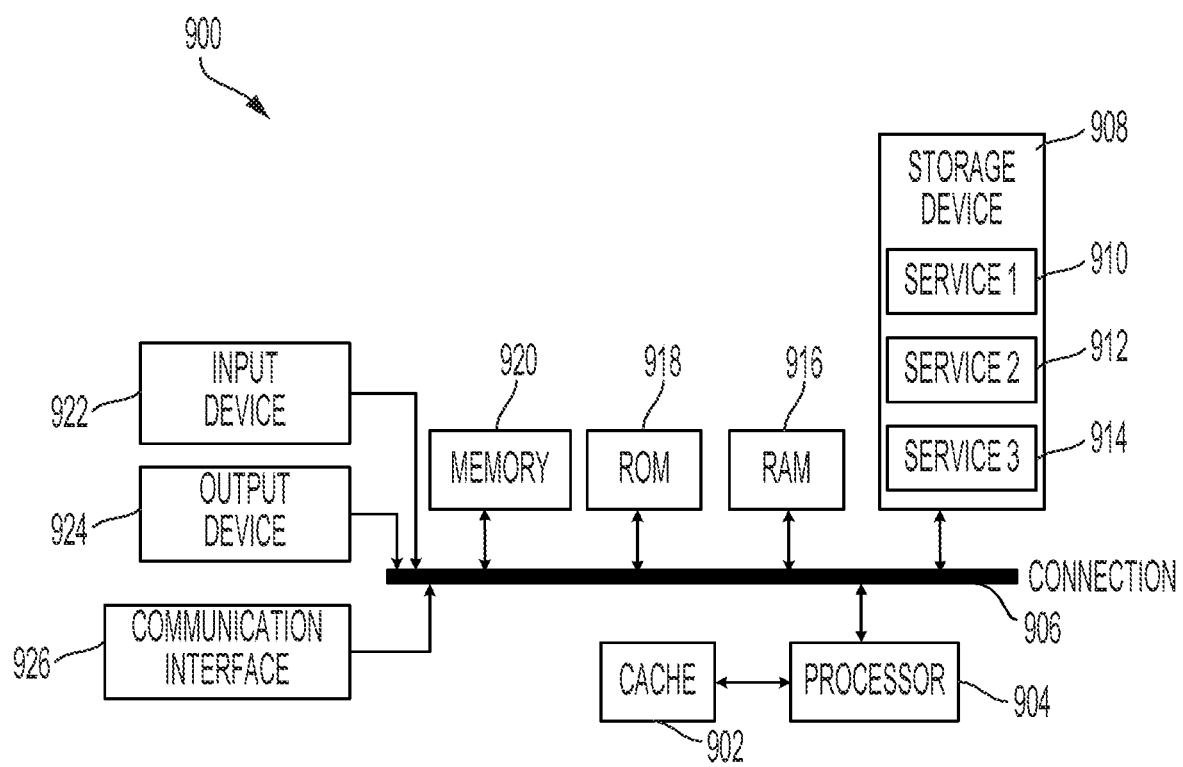
FIG. 9 illustrates an example computing device architecture in accordance with some examples.

The approaches herein can provide a method for validating the integrity of a system participating in service discovery in a network. The disclosure begins with an initial discussion of systems and technologies for providing explicit verifiable proof of integrity of network nodes. A description of example systems, methods and environments for providing verifiable proof of integrity of network nodes, as illustrated in FIGS. 1 through 4, will then follow. In FIGS. 5 through 7, example flows illustrate how canary stamps are transmitted with respect to DNS/mDNS service discovery. The discussion concludes with a description of an example network device and an example computing device architecture, as illustrated in FIGS. 8 and 9, including example hardware components suitable for performing various networking and computing operations described herein.

The disclosure now turns to an initial discussion of example concepts and technologies for providing verifiable proof of integrity of network nodes. A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices, and maintain these logs in trusted storage. These logs can be protected by embedding a private key into every trust anchor produced for a hardware device, and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, canary stamps, which can refer to tokens or metadata elements containing security measurements or evidence, can be used to provide verifiable evidence of device trustworthiness (e.g., integrity, state, etc.). Such verifiable evidence can be appended or included in packets transmitted by nodes on a network. The canary stamps can thus be used to evaluate the trustworthiness of a node(s) and react accordingly. For example, a device or entity can review a canary stamp associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is a random number that can be used to introduce randomness. In some cases, a nonce can passed into a TPM and/or incorporated into a canary stamp. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may be less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages. In some cases, such tokes can include canary stamps. Such tokens can be referred to as canary stamps because each signed measurement is like a stamp proving its authenticity, and like a canary in a coal mine they indicate an early sign of trouble.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, canary stamps (e.g., tokens or metadata elements) can be created by extracting current counters (e.g., clock, reset, restart) from a node's TPM, and incorporating such counters and security measures taken from the node into a packet. In some examples, the current counters and/or security measures can be hashed with information within an external TPM. The canary stamp can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries.

Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of canary stamps can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, one or more canary stamps (e.g., tokens or metadata elements) and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, canary stamps (e.g., tokens or metadata elements containing or reflecting security measures) are used as previously mentioned to validate the integrity of a node and perform continuous evaluation of node integrity. Thus, the canary stamps described herein can be used to provide proof of transit through uncompromised nodes. In some examples, the canary stamp can be added as additional metadata to packets that traverse a network where proof of transit via uncompromised nodes is desired. Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The networking environment 100 can also include an attestation routing orchestrator 104. The attestation routing orchestrator 104 can communicate with the destination node 116. In some implementations, the attestation routing orchestrator 104 can obtain attestation data (e.g., canary stamps, security measures, signatures, and/or metadata) or vectors from the destination node 116.

The attestation routing orchestrator 104 can communicate with a verifier system 106. In some implementations, the attestation routing orchestrator 104 can obtain trusted state information, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

Figure 2:
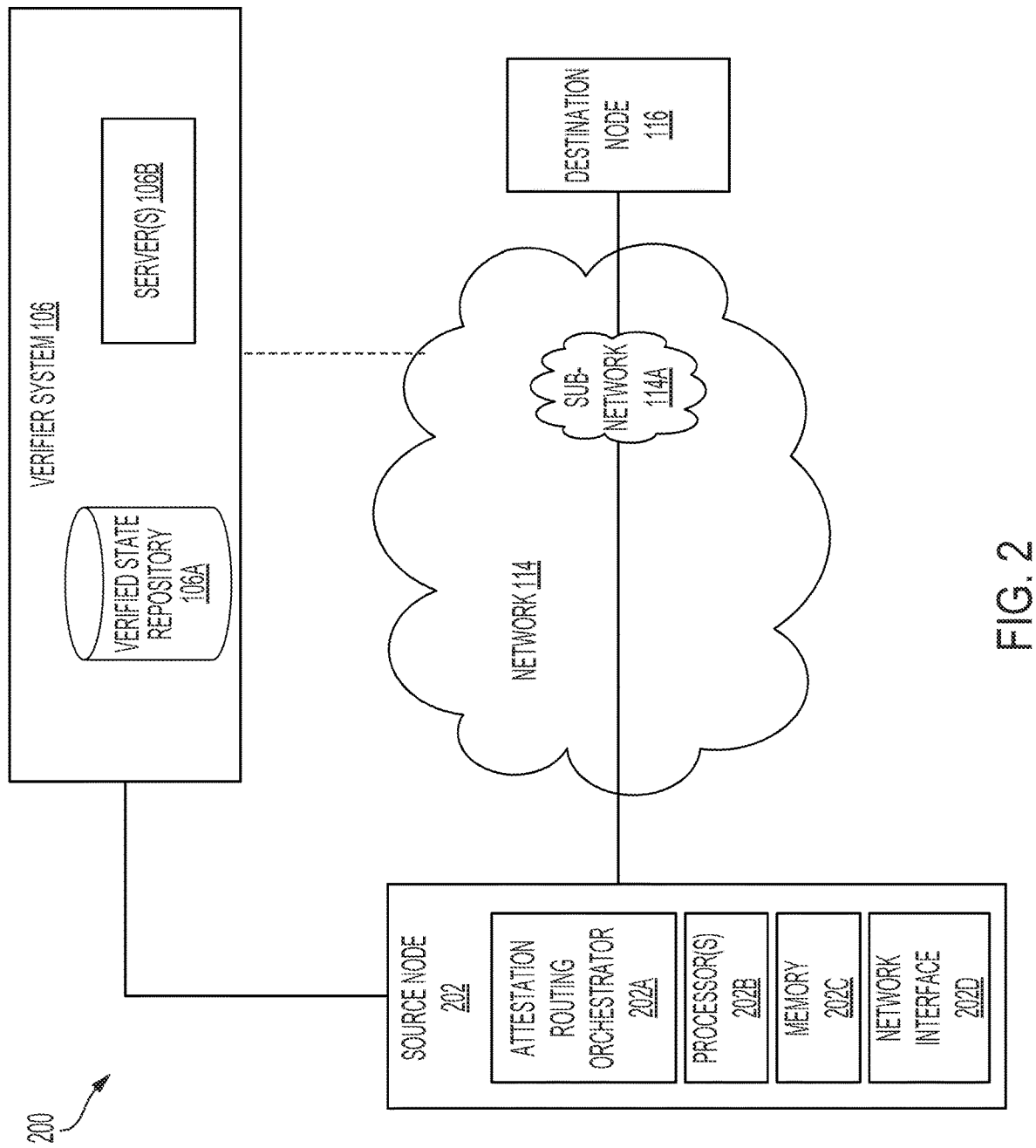

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the destination node 116. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the destination node 116 and optionally attestation states or vectors obtained from the destination node 116. The source node 202 can also include a network interface 202D for obtaining, receiving, and transmitting the data packets and states or vectors. In some implementations, the source node 202 can select and direct a data packet to the destination node 116 based a trusted state or image vector and the attestation states or vectors.

Figure 3:
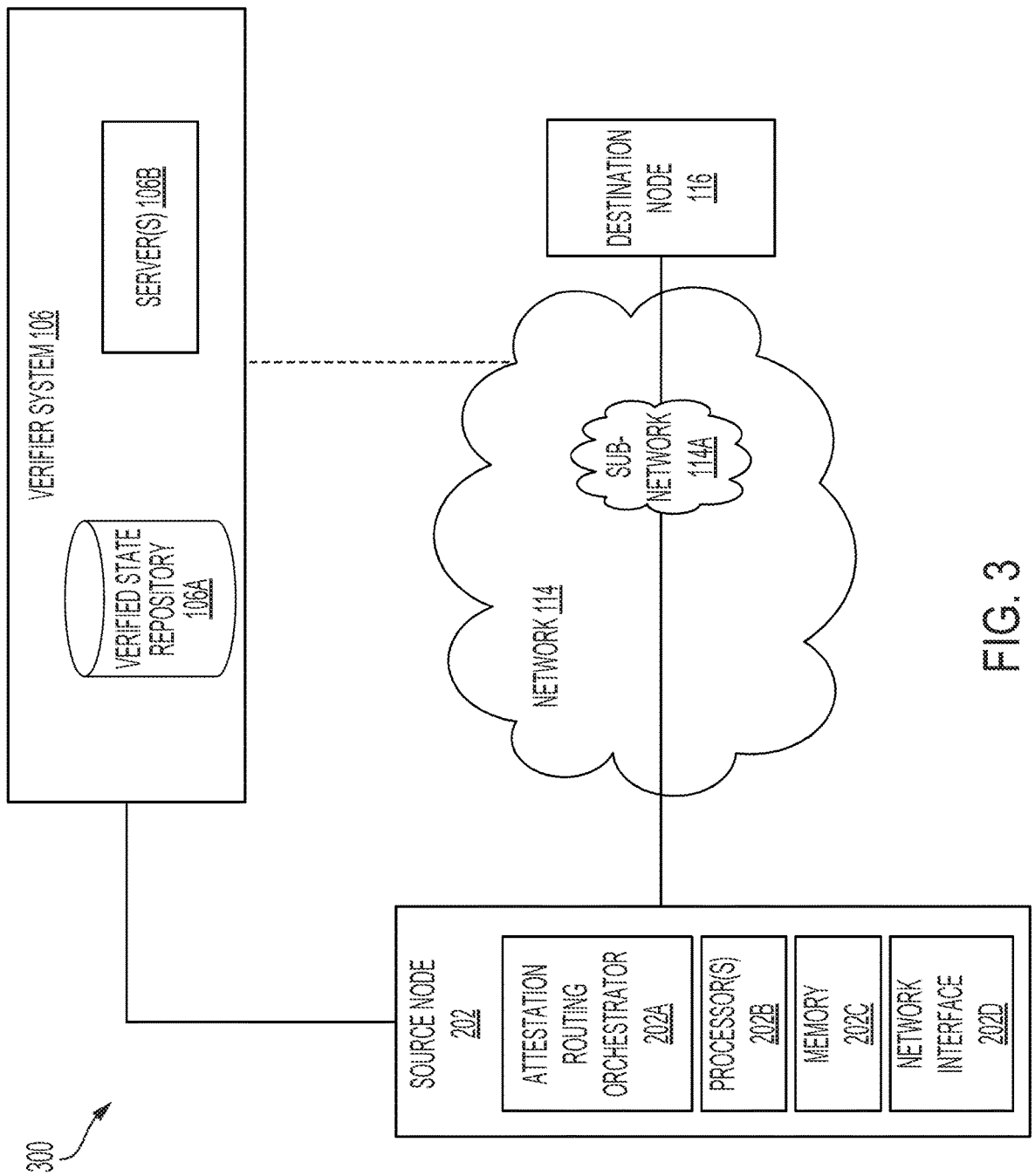

FIG. 3 is a block diagram of another example networking environment 300 in accordance with some implementations. In this example, the destination node 116 can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to the destination node 116, which in turn can provide the signed trusted state or image vector to the source node 302.

Moreover, in implementations in which the source node 302 is not connected to the verifier system 106 (e.g., link down), obtaining the trusted state or image vector from the destination node 116 provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest the destination node 116.

Figure 4:
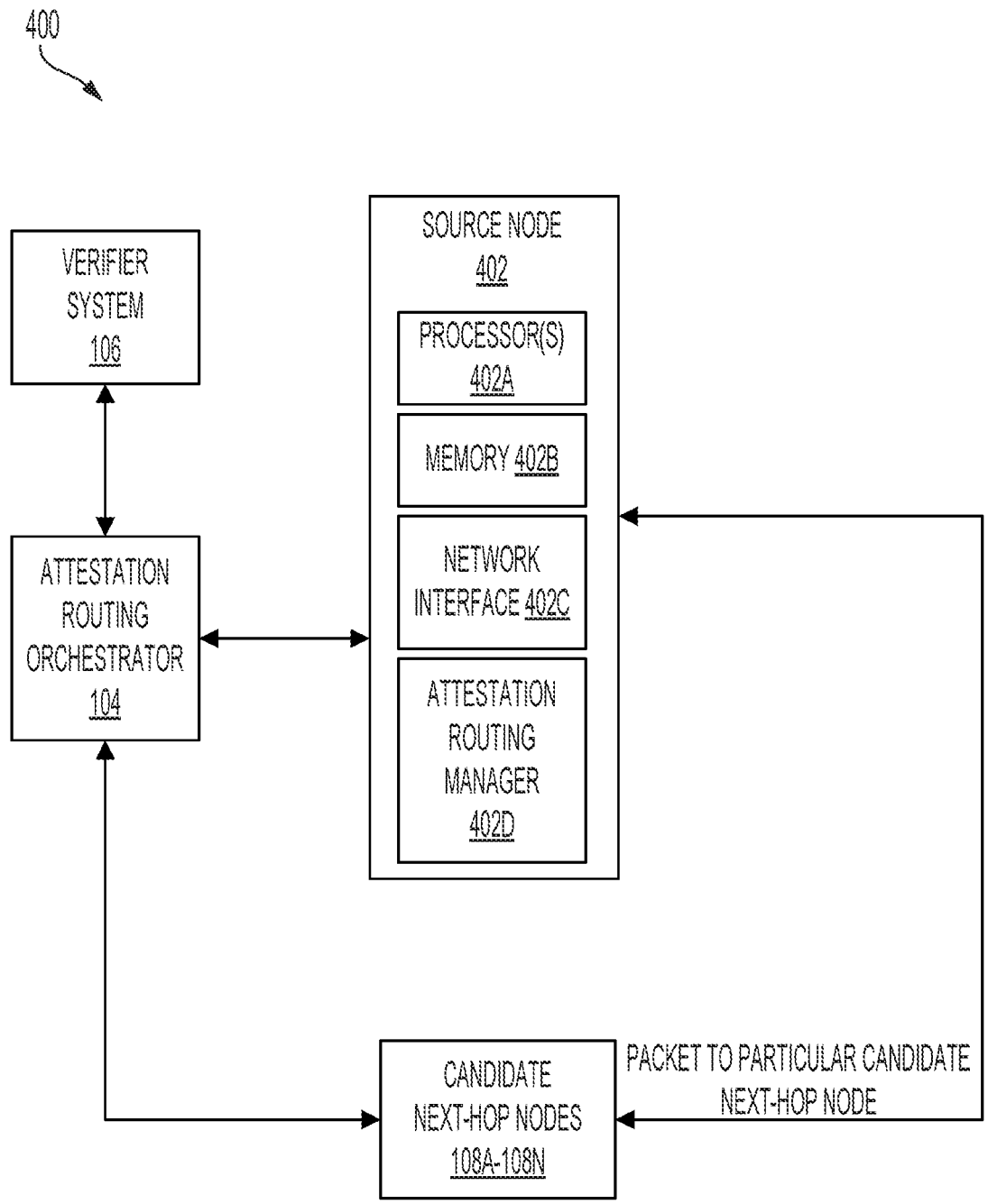
FIG. 4 illustrates an example of a controller orchestrated attestation-based routing, in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes candidate next-hop nodes 108A-N and optionally candidate second-hop nodes 110A-N and/or candidate N-hop nodes 112A-N. For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC).

The attestation routing orchestrator 104 can obtain attestation data (e.g., canary stamps) from the destination node 116. The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106. The attestation routing orchestrator 104 can select, from the confidence scores, a particular confidence score that satisfies one or more selection criteria.

The attestation routing orchestrator 104 can direct a data packet destined for the destination node 116. For example, in some cases, the attestation routing orchestrator 104 can provide attested route information (e.g., validated canary stamp data, security measurements, etc.) to an attestation routing manager 402D of the source node 402 in order to facilitate the source node 402 sending the data packet to the destination node 116. The attested route information can be indicative of the trustworthiness of the route to the destination node 116.

For example, in some implementations, the attested route information includes an identifier (e.g., an IP address, a MAC address, an SSID, etc.) identifying the destination node 116. In this example, the source node 402 can provide the data packet based on the identifier in order to route the data packet to the secure destination node 116.

As another example, in some implementations, the attested route information can include confidence scores associated with the destination node 116. In this example, the attestation routing manager 402D can select a particular candidate score based on one or more selection criteria. Moreover, the attestation routing manager 402D can provide the data packet to the destination node 116 associated with the particular candidate score. In some examples, the attestation routing orchestrator 104 can cease to direct additional data packets to the particular destination node 116 in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromise can be a function of the time which has passed since a last validation that the device is in a known good state. In some cases, with the foregoing indicators, a formula can be provided for estimating probability or chance of a compromise on any given device operating within a network.

For example, $P\_v_1$ can be defined as a probability for compromise of type 1 when there is a specific set of events/signatures existing which correspond to the compromise. $P\_v_2$ can be defined as probability for compromise of type 2 and $P\_v_x$ can be defined as probability for compromise of type x. Assuming each of these compromises ($P\_v_1$ through $P\_v_x$) are independent, the following equation can provide the probability of a compromise based on recognized signatures (P_v):

$$P\_v = 1-(1-P\_v_1)(1-P\_v_2)(1-P\_v_x)) \quad \text{Equation (1).}$$

Other type of equations can be used instead of, or in conjunction with, equation (1) when there are interdependencies between different types of evaluated compromises ($P\_v_1$, $P\_v_2$, $P\_v_x$).

Furthermore, in some cases, a given probability (e.g., $P\_v_1$-$P\_v_x$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i = 1-((1-\text{chance of invisible compromise in time period } t)^{\wedge}\text{number of } t \text{ intervals since a last verification of a good/uncompromised system state}) \quad \text{Equation (2).}$$

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulas for visible and invisible factors as described above (equation (1) and equation (2)), an overall probability of a compromise for a given device may be given by:

$$P_c = 1-((1-P_v)*(1-P_i)) \quad \text{Equation (3).}$$

Equation (3) provides an indicator of trustworthiness of a given device. This metric considers both time-based entropy and any available evidence which can be correlated to known compromises.

If $P_c$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_c$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

The source node 102 may act as the attestor in connection with the attestation routing orchestrator 104 to attest as to the trustworthiness of the destination node 116, wherein the proof of integrity and freshness may be determined using the above-mentioned methods. Depending on which device is the attestor/attestee, the DNS server 504, the end device 502, 602, and/or the mDNS controller 604 may serve as the source node 102 or alternatively, the destination node 116. The ability for any of these devices to attest as to the trustworthiness of another device that it plans on establishing a connection with is important for not only determine if the device in a good state but also that the device is the device it claims to be. Especially with respect to mDNS, due to its unsecured multicasting nature, there are various forms of attack, such as MAC address spoofing, identity forging, and cache poisoning, wherein the attesting the identity and whether the device is in a good state is important before establishing a connection.

When the DNS/mDNS message with attestation of integrity is received, the recipient may validate the integrity of the service provider 506, 606 advertising the service. Based on the level of trust, various policies can be applied e.g., wherein the service provider 506, 606 is selected and connected to the end device 502, 602 after establishing a certain level of trust and via the connection, a heart-beat message is communicated back and forth to reevaluate the integrity of the service provider 506, 606 at certain set intervals. Further, granular policies may be implemented based on the critical nature of the service.

Figure 5A:
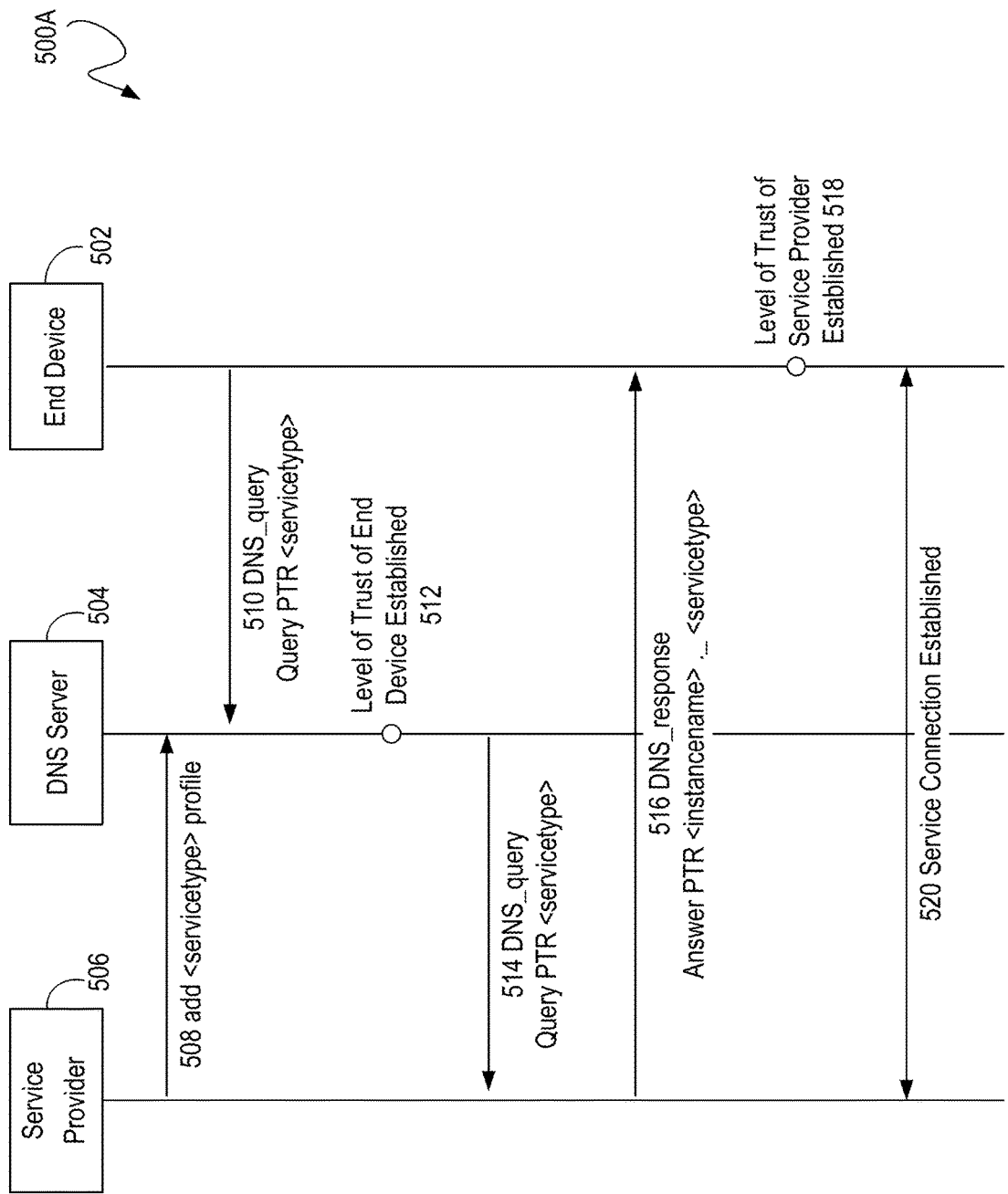
FIGS. 5A, 5B, 6A, and 6B illustrate example flows for service discovery in accordance with some examples.

FIG. 5A is an example call flow 500A of service discovery in accordance with some implementations. A service provider 506 may add (508) a service type (<servicetype>) profile with a DNS server 504. The DNS server 504 may receive a service profile from various service providers, including service provider 506 that provides the particular service, <servicetype>, for example. An end device 502 may request (510) a particular service and send a query a DNS Server 504 to provide the end device 502 for a service provider that provides that particular service. In the query, such as DNS_query to query PTR<servicetype>, the end device 502 may include attestation data for the DNS server 504 to establish a level of trust of the end device 502 in any of the above-mentioned attestation methods and/or a challenge for the service provide 506 to provide an answer in response in order to establish a level of trust with the service provider 506. The DNS server 504 may established (512) a level of trust with the end device 502 to continue (514) the service discovery request, wherein the DNS_query may be further sent to the service provider 506 that has a matching service type as the particular service requested by the end device 502. The service provider 506 may respond (516) with a DNS_response of Answer PTR <instancename>._<servicetype> to the DNS server 504 and/or the end device 502. In the DNS_response, the service provider 506 may provide the answer for the end device 502 to establish a level of trust with using any of the above-mentioned attestation methods. The end device 502 may established (518) a level of trust with the service provider 506 and establish (520) a service connection with the service provider 506.

Figure 5B:
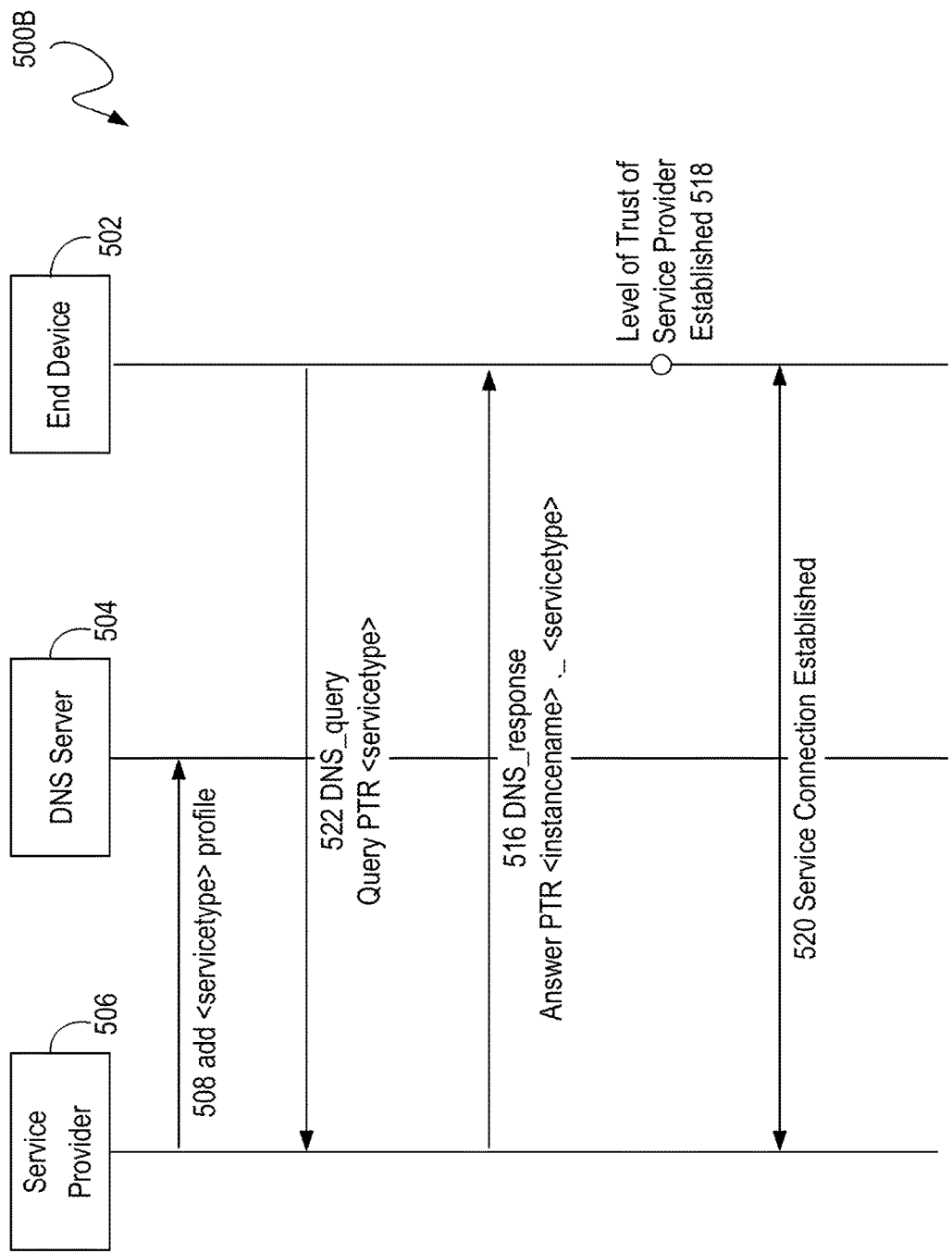

FIG. 5B is another example call flow 500B of service discovery in accordance with some implementations. A service provider 506 may add (508) the service type (<servicetype>) profile with the DNS server 504. The end device 502 may request (522) a particular service, may be via a DNS Server 504, for a service provider that provides that particular service. In the query, such as DNS_query to query PTR<servicetype>, the end device 502 may include a challenge for the service provide 506 to provide an answer in response in order to establish a level of trust with the service provider 506. The service provider 506 may respond (516) with a DNS_response of Answer PTR <instancename>, _<servicetype> to the end device 502. In the DNS_response, the service provider 506 may provide the answer for the end device 502 to establish a level of trust with using any of the above-mentioned attestation methods such that the DNS message carries a canary stamp/proof of integrity as a DNS record that can be validated to determine trustworthiness. The end device 502 may established (518) a level of trust with the service provider 506 and establish (520) a service connection with the service provider 506.

The attestation data may comprises metadata about a proof of integrity of the responding network device (attestee) provided by an evaluation of the answer, by a trusted platform module crypto-processor, with respect to an identity of hardware and software components of the responding network device, whether it is the DNS server 504, the service provider 506, or the end device 502, and the answer is evaluated based on logs maintained in a trusted storage of the responding network device, wherein the logs indicate a set of transactions that have occurred since boot time and provides data regarding trustworthiness of the responding network device.

The attestation data may comprises a proof of freshness using a signature over verifiably fresh data such as a current time when the response is sent. The attestation data may further comprises a challenge comprising a nonce that is passed through a trusted platform module crypto-processor associated with the responding network device to generate a signature based on the nonce, wherein the signature could not been generated before the nonce was provided, and wherein the response comprises the signature. The attestation data may comprises a proof of freshness by a canary stamp, wherein the attestor validates the canary stamp with respect to the responding network device's freshness of data based on a state of internal counters within a trusted platform module crypto-processor associated with the responding network device.

The DNS server 504 may host a directory of reference integrity values, known good reference values, and public keys published as certificates of other peer devices for validating the canary stamps or other proof of integrity data offered. The DNS server 504 may detects a change in an IP address of the responding network device and dynamically identifies a level of trust for the responding network device before updating the IP address in the dynamic DNS server's directory, by re-validating information the canary stamp appended to the responding network device's DNS response indicating a change in IP address.

Further, there may be multiple DNS responses from multiple responding network devices, such that each DNS response comprising a random number, forming a set of random numbers, wherein the set of random numbers are algorithmically combined into a single nonce, wherein the single nonce is passed through a crypto-processor to generate a signature based on the single nonce, and wherein the set of random numbers is combined algorithmically into a single nonce using a Bloom filter. The Bloom filter is a data structure designed to, rapidly and memory-efficiently, determine whether an element is present in a set.

Figure 6A:
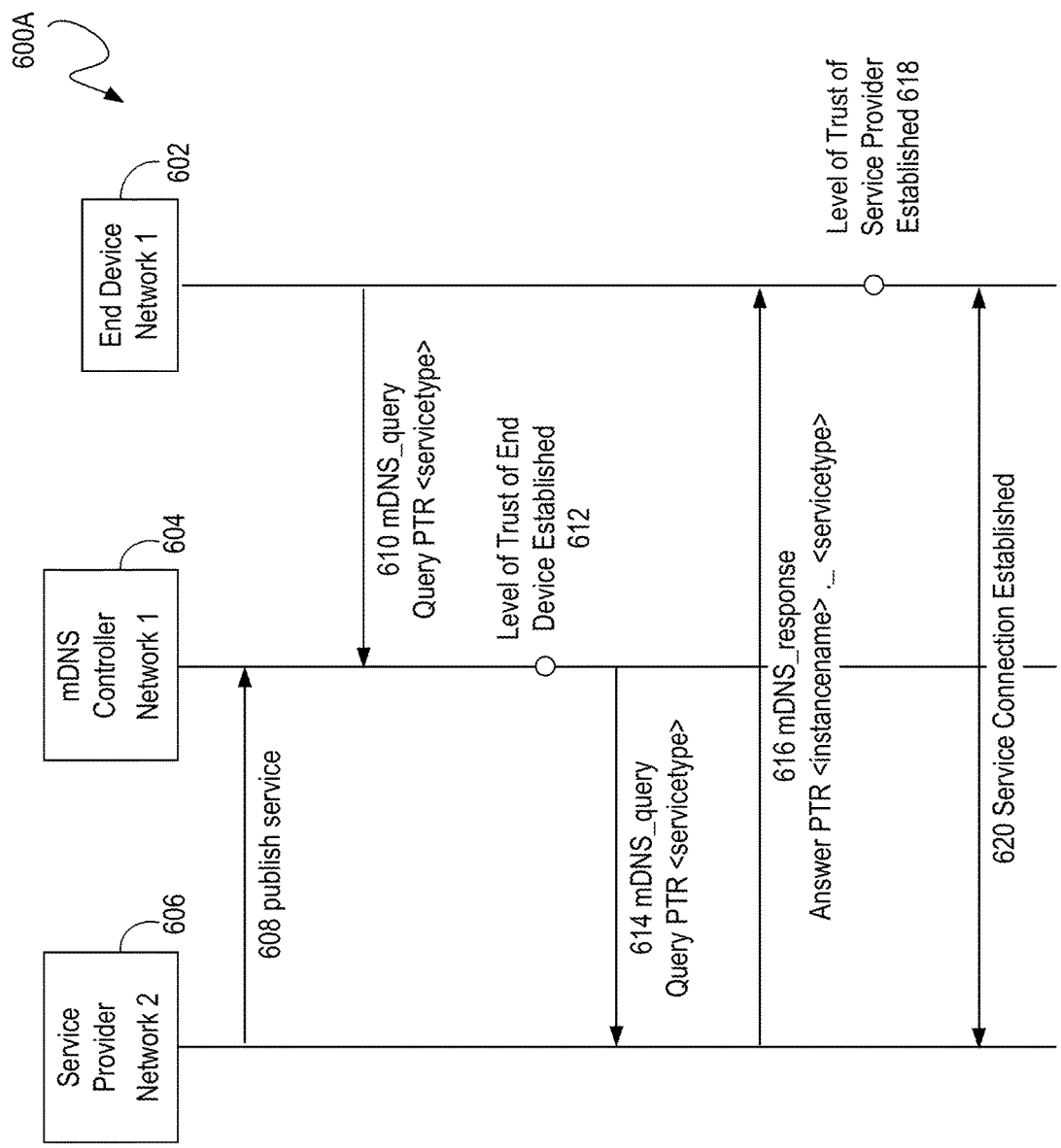

FIG. 6A is another example call flow 600A of service discovery in accordance with some implementations. A service provider 606, which may be in a different network than an end device 602, may add (608) publish its service to an mDNS controller 604, which may share the same network as the end device 602. The mDNS controller 604 may receive published services from various service providers, including service provider 606. The end device 602 may request (610) a particular service and send a query to the mDNS controller 604 to provide the end device 602 a service provider that provides that particular service. In the query, such as mDNS_query to query PTR<servicetype>, the end device 602 may include attestation data for the mDNS controller 604 to establish a level of trust of the end device 602 in any of the above-mentioned attestation methods and/or a challenge for the service provider 606 to provide an answer in response, in order to establish a level of trust with the service provider 606.

The mDNS controller 604 may established (612) a level of trust with the end device 602 to continue (614) the service discovery request, wherein the mDNS_query may be further sent to the service provider 606 that has a matching service type as the particular service requested by the end device 602. The service provider 606 may respond (616) with a DNS_response of Answer PTR <instancename>,_<servicetype> to the mDNS controller 604 and/or the end device 602. In the DNS_response, the service provider 606 may provide the answer for the end device 602 to establish a level of trust with using any of the above-mentioned attestation methods. The end device 602 may established (618) a level of trust with the service provider 606 and establish (620) a service connection with the service provider 606.

Figure 6B:
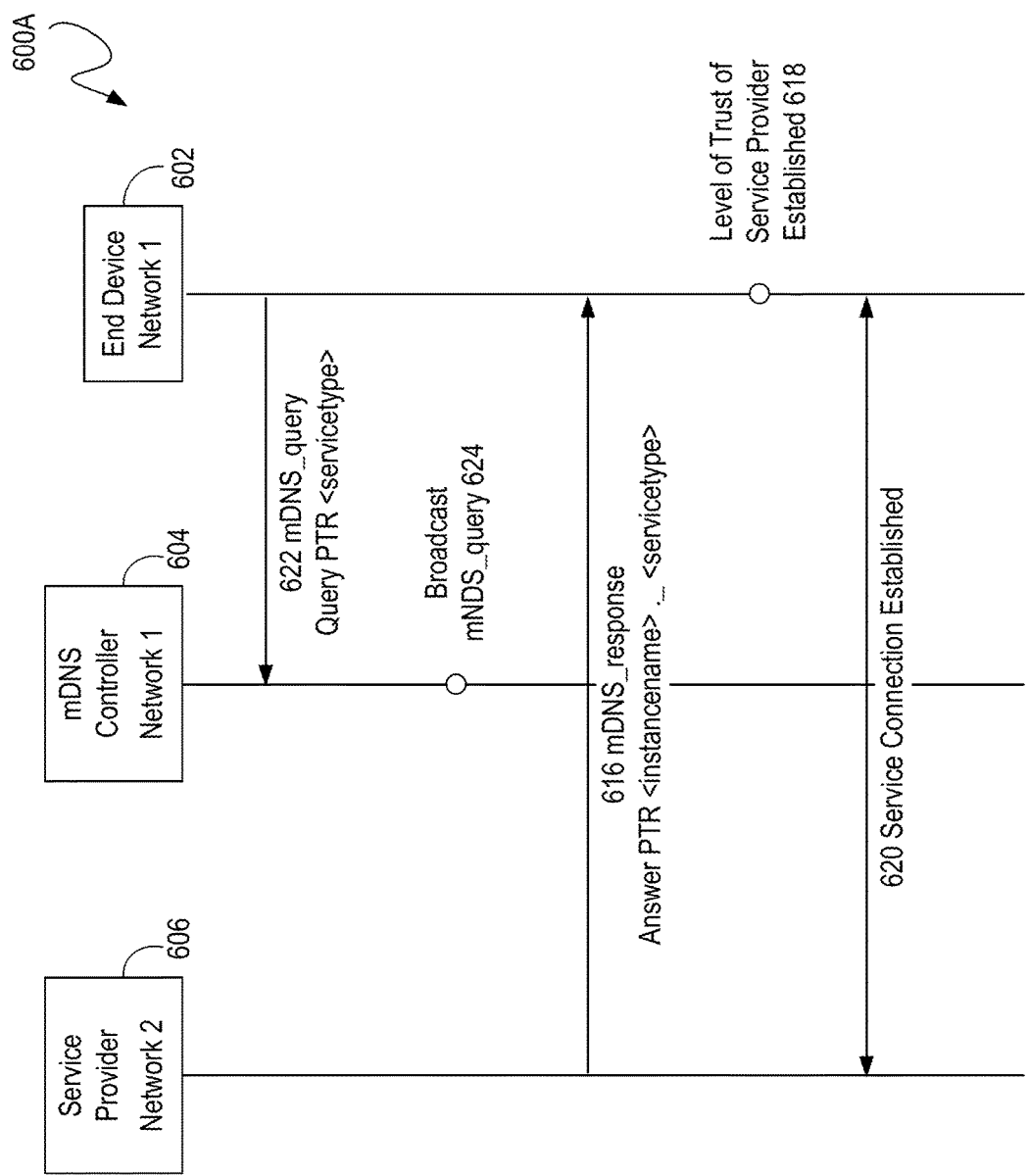

FIG. 6B is another example call flow 600B of service discovery in accordance with some implementations. The end device 602 may request (622) a particular service via the mDNS controller 604 for a service provider that provides that particular service. In the query, such as DNS_query to query PTR<servicetype>, the end device 602 may include a challenge for the service provide 606 to provide an answer in response, in order to establish a level of trust with the service provider 606. The mDNS controller 604 may broadcast (625) the DNS_query to various networks. The service provider 606 may respond (616) with a DNS_response of Answer PTR <instancename>,_<servicetype> to the end device 602. In the DNS_response, the service provider 606 may provide the answer for the end device 602 to establish a level of trust with using any of the above-mentioned attestation methods. The end device 602 may established (618) a level of trust with the service provider 606 and establish (620) a service connection with the service provider 606.

The attestation data may comprise metadata about the proof of integrity of the responding network device (attestee), whether it is the mDNS controller 604, the service provider 606, or the end device 602, provided by an evaluation of the answer, by a trusted platform module crypto-processor, with respect to the identity of hardware and software components of the responding network device. The answer may be evaluated based on logs maintained in a trusted storage of the responding network device, wherein the logs indicate a set of transactions that have occurred since boot time and provides data regarding the responding network device's trustworthiness.

The attestation data may further comprise a proof of freshness by means of a canary stamp, wherein the canary stamp may validate the responding network device's freshness of data based on a state of internal counters within a trusted platform module crypto-processor associated with the responding network device. The canary stamp may comprise extracted current counters from the responding network device's trusted platform module crypto-processor and hashed with information within an external trusted platform module crypto-processor.

Figure 7A:
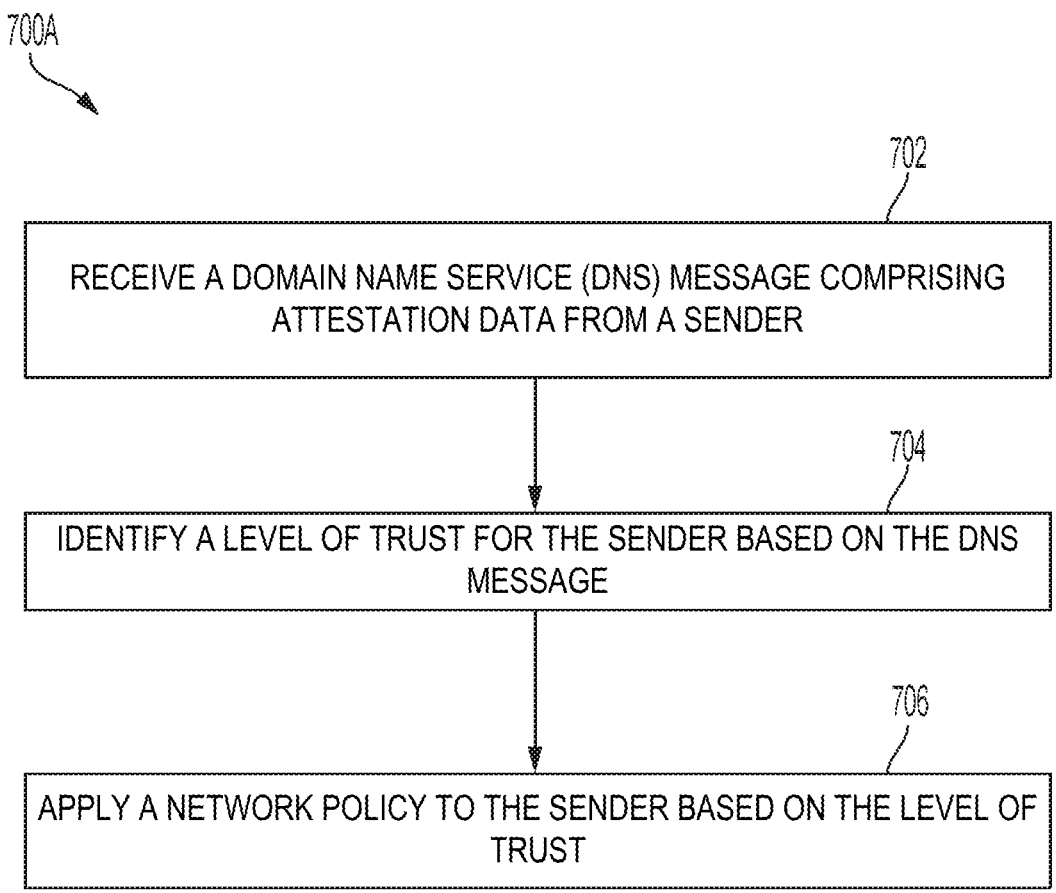
FIGS. 7A-7D illustrates example methods for service discovery, in accordance with some examples.

FIG. 7A is an example method 700A for service discovery in accordance with some implementations. In step 702, a domain name service (DNS) message (or an mDNS message) may be received by an attestor, wherein the DNS message comprises attestation data from a sender, the attestee. The attestor may be the end device 502, 602, the DNS server 504, the mDNS controller 604, or whichever device that wishes to test a level of trust of another device, the attestee. The attestee may be the end device 502, 602, the DNS server 504, the mDNS controller 604, or whichever device that is being test for a level of trust by the attestor In step 704, the attestor may identify the level of trust for the sender/attestee based on the DNS message. In step 706, the attestor may apply a network security policy to the sender/attestee based on the level of trust. For example, if the level of trust is established, the attestee is allowed to connect to the sender. Another example is after the service provider is verified the services advertised are added to the list of available/valid trusted services in the local system directory. For example, a set of printers may be discovered in the network and some of them are found to be trustworthy then the system dialogue where printers are displayed when a used lookup for printing, an indication of the printers that are trustworthy can be provided.

Figure 7B:
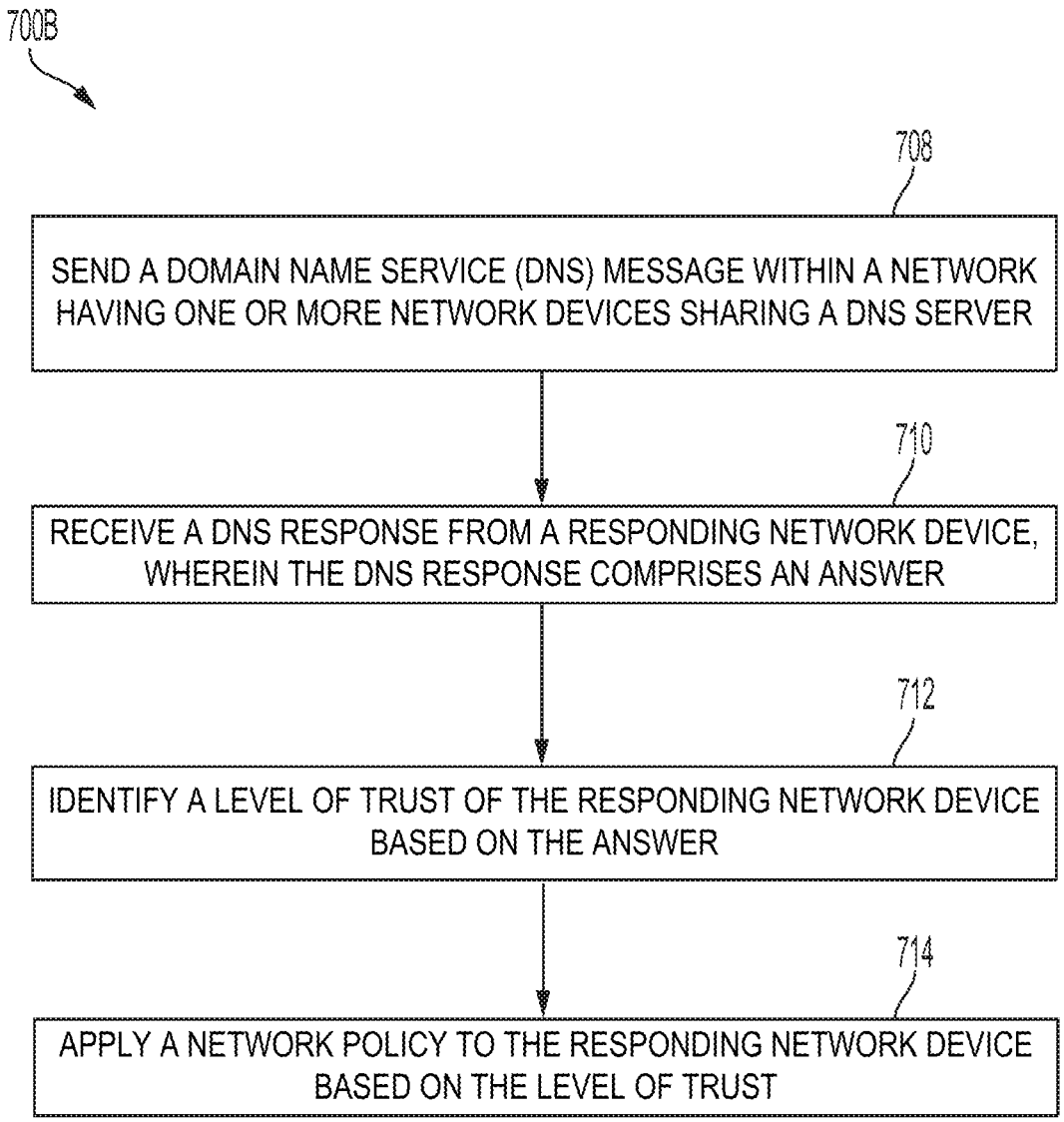

FIG. 7B is another example method 700B for service discovery in accordance with some implementations. In step 708, the domain name service (DNS) message or query may be sent within a network having one or more network devices sharing the DNS server 504. In step 710, the DNS response may be received from a responding network device or service provider 506, wherein the DNS response comprises the answer that is in response to the DNS message or query. In step 712, the level of trust of the responding network device may be identified based on the answer, and in step 714, a network policy may be applied to the responding network device based on the level of trust, wherein the DNS message may further comprise a service request for a particular service and the responding network device offers the particular service.

Figure 7C:
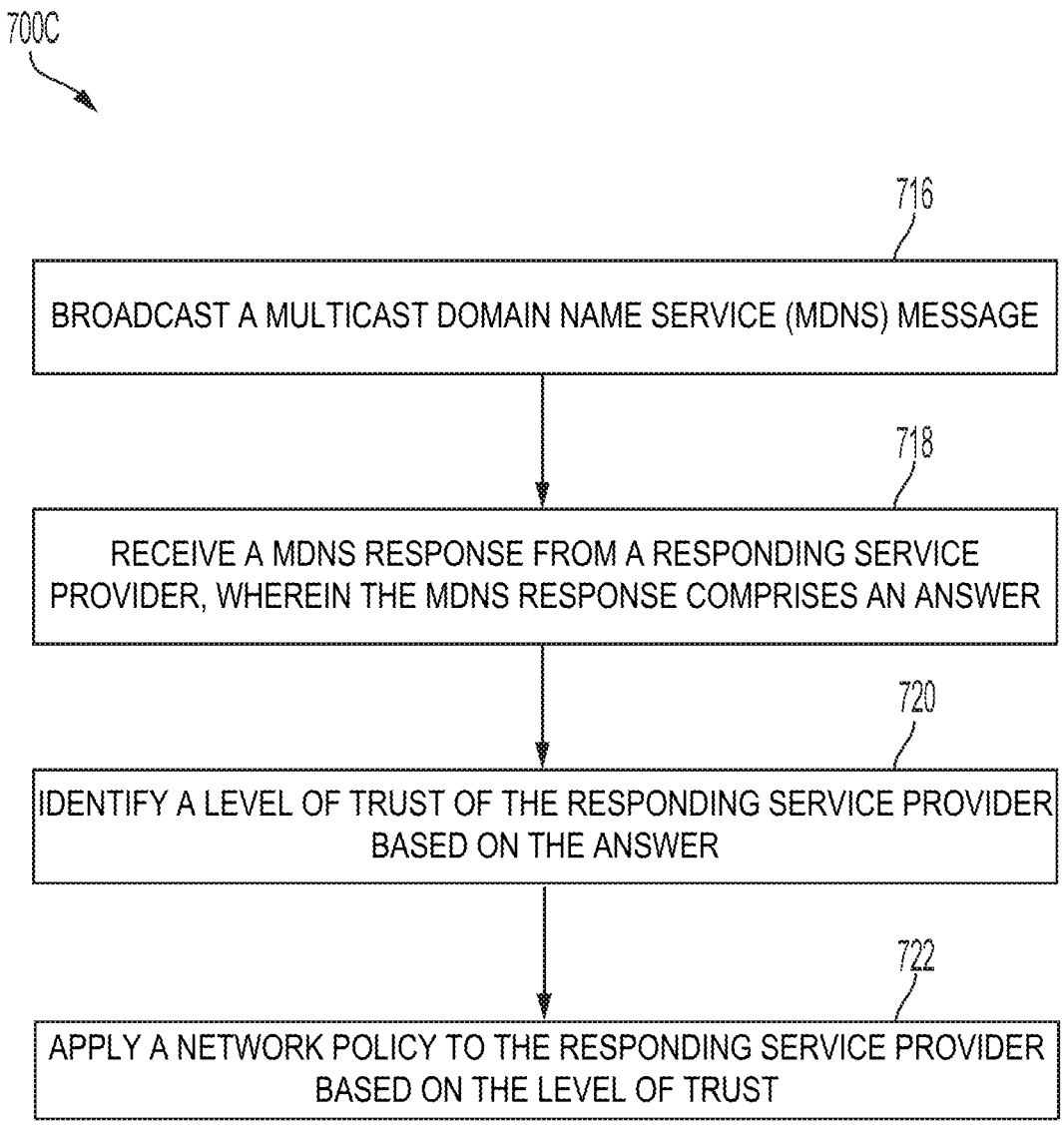

FIG. 7C is another example method 700C for service discovery in accordance with some implementations. In step 716, a multicast domain name service (mDNS) message may be broadcasted, wherein the mDNS message may further comprise a service request for a particular service. In step 718, a mDNS response may be received from a responding service provider, wherein the mDNS response comprises an answer. In step 720, a level of trust of the responding service provider may be identified based on the answer and in step 722, a network policy to the responding service provider may be applied based on the level of trust, wherein the responding network device offers the particular service.

Figure 7D:
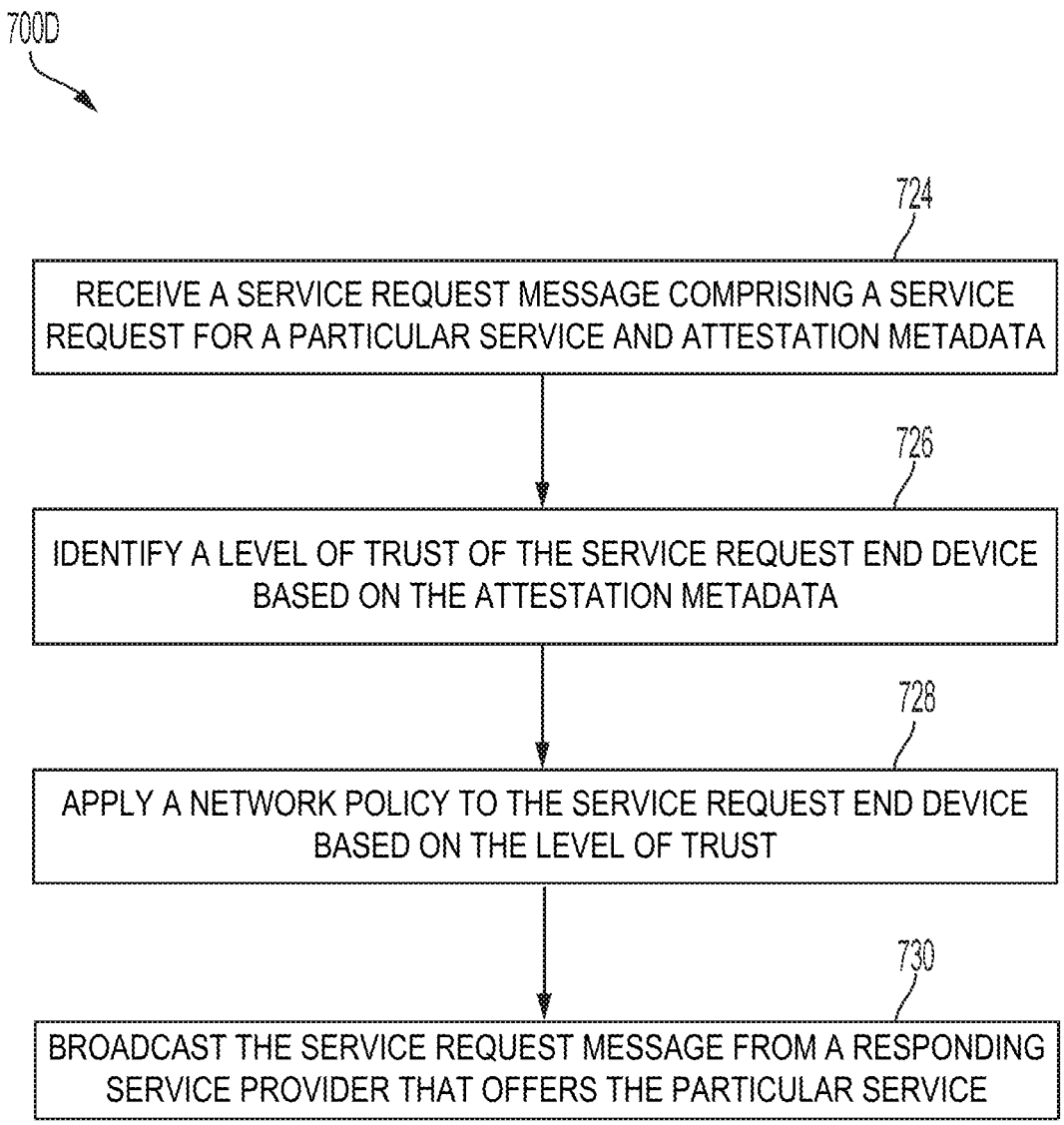

FIG. 7D is another example method 700D for service discovery in accordance with some implementations. In step 724, a service request message may be received, comprising a service request for a particular service and attestation metadata. In step 726, a level of trust of the service request end device may be identified based on the attestation metadata. In step 728, a network policy to the service request end device may be applied based on the level of trust, and in step 730, the service request message may be broadcasted for a responding service provider that offers the particular service.

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X98 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method, comprising:
sending a service provider request within a network having one or more network devices sharing a server;
receiving a response from a responding network device, wherein the response comprises an answer;
identifying a level of trust of the responding network device based on the answer; and applying a network policy to the responding network device based on the level of trust,
wherein the service provider request further comprises a service request for a particular service and the responding network device offers the particular service,
wherein the service provider request is a DNS request and the response is a DNS response, and
wherein the DNS response further comprises metadata about a proof of integrity of the responding network device provided by an evaluation of the answer, by a trusted platform module crypto-processor, with respect to an identity of hardware and software components of the responding network device, and
wherein the answer is evaluated based on logs maintained in a trusted storage of the responding network device, wherein the logs indicate a set of transactions that have occurred since boot time and provides data regarding trustworthiness of the responding network device.

2. The computer-implemented method of claim 1, wherein the DNS response further comprises a proof of freshness using a signature over verifiably fresh data such as a current time when the DNS response is sent.

3. The computer-implemented method of claim 2,
wherein the DNS request comprises a challenge comprising a nonce that is passed through the trusted platform module crypto-processor associated with the responding network device to generate a signature based on the nonce,
wherein the signature could not been generated before the nonce was provided, and
wherein the DNS response comprises the signature.

4. The computer-implemented method of claim 1,
wherein the DNS response further comprises a proof of freshness by a token,
wherein the server validates the token with respect to the responding network device's freshness of data based on a state of internal counters within the trusted platform module crypto-processor associated with the responding network device, and
wherein the server hosts a directory of reference integrity values, known good reference values, and public keys published as certificates of other peer devices for validating tokens.

5. The computer-implemented method of claim 4, wherein the server detects a change in an IP address of the responding network device and dynamically identifies a level of trust for the responding network device before updating the IP address in the directory of the server, by re-validating information the token appended to the responding network device's DNS response indicating a change in IP address.

6. The computer-implemented method of claim 1, further comprising:
receiving multiple DNS responses from multiple responding network devices, each DNS response comprising a random number, forming a set of random numbers,
wherein the set of random numbers are algorithmically combined into a single nonce, and
wherein the single nonce is passed through a crypto-processor to generate a signature based on the single nonce.

7. The computer-implemented method of claim 6, wherein the set of random numbers is combined algorithmically into a single nonce using a Bloom filter.

8. The computer-implemented method of claim 1, wherein the network policy for the responding network device is reevaluated at a predetermined frequency.

9. A non-transitory computer-readable storage medium storing instructions that, when executed by one or more processor, cause a computing device to:
broadcast a multicast domain name service (mDNS) message;
receive a mDNS response from a responding service provider, wherein the mDNS response comprises an answer;
identify a level of trust of the responding service provider based on the answer; and apply a network policy to the responding service provider based on the level of trust,
wherein the mDNS message further comprises a service request for a particular service and a responding network device offers the particular service,
wherein the mDNS response further comprises metadata about the responding network device's proof of integrity provided by an evaluation of the answer, by a trusted platform module crypto-processor, with respect to the identity of hardware and software components of the responding network device, and
wherein the answer is evaluated based on logs maintained in a trusted storage of the responding network device, wherein the logs indicate a set of transactions that have occurred since boot time and provides data regarding the responding network device's trustworthiness.

10. The non-transitory computer-readable storage medium of claim 9, wherein the mDNS response further comprises a proof of freshness by means of a token, wherein the token validates the responding network device's freshness of data based on a state of internal counters within a trusted platform module crypto-processor associated with the responding network device.

11. The non-transitory computer-readable storage medium of claim 10, wherein the token comprises extracted current counters from the responding network device's trusted platform module crypto-processor and hashed with information within an external trusted platform module crypto-processor.

12. The non-transitory computer-readable storage medium of claim 9, wherein the network policy for the responding network device is reevaluated at a predetermined frequency.

13. A system, comprising:
at least one processor; and
memory including instructions that, when executed by the at least one processor, cause the at least one processor to:
receive a service request message comprising a service request for a particular service and attestation metadata;
identify a level of trust of an end device of the service request based on the attestation metadata;
apply a network policy to the end device of the service request based on the level of trust; and
broadcast the service request message for a responding service provider that offers the particular service,
wherein the attestation metadata comprises metadata about the service request end device's proof of integrity provided by an evaluation of the attestation metadata, by a trusted platform module crypto-processor, with respect to the identity of hardware and software components of the end device of the service request, and wherein the attestation metadata is evaluated based on logs maintained in a trusted storage of the end device of the service request, wherein the logs indicate a set of transactions that have occurred since boot time and provides data regarding the end device's trustworthiness.

14. The system of claim 13, wherein the service request message further comprises a proof of freshness by means of a signature over verifiably fresh data such as a current time when the service request message is sent.

* * * * *